US012076933B2

(12) United States Patent
Kumaki et al.

(10) Patent No.: US 12,076,933 B2
(45) Date of Patent: Sep. 3, 2024

(54) USE OF POLYHYDROXY COMPOUND AS PLASTICIZER FOR POLYVINYL ALCOHOL IN 3D PRINTING PROCESS

(71) Applicant: KURARAY CO., LTD., Kurashiki (JP)

(72) Inventors: Yousuke Kumaki, Troisdorf (DE); Moritz Baier, Hofheim (DE)

(73) Assignee: KURARAY CO., LTD., Kurashiki (JP)

( * ) Notice: Subject to any disclaimer, the term of this patent is extended or adjusted under 35 U.S.C. 154(b) by 219 days.

(21) Appl. No.: 16/342,340

(22) PCT Filed: Oct. 16, 2017

(86) PCT No.: PCT/EP2017/076381
§ 371 (c)(1),
(2) Date: Apr. 16, 2019

(87) PCT Pub. No.: WO2018/073190
PCT Pub. Date: Apr. 26, 2018

(65) Prior Publication Data
US 2020/0047418 A1 Feb. 13, 2020

(30) Foreign Application Priority Data
Oct. 18, 2016 (DE) ..................... 10 2016 220 434.3

(51) Int. Cl.
*B29C 64/00* (2017.01)
*B29C 64/40* (2017.01)
*B33Y 70/00* (2020.01)
*C09D 11/106* (2014.01)
*B29K 29/00* (2006.01)

(52) U.S. Cl.
CPC .............. *B29C 64/40* (2017.08); *B33Y 70/00* (2014.12); *C09D 11/106* (2013.01); *B29K 2029/04* (2013.01); *B29K 2995/0062* (2013.01)

(58) Field of Classification Search
CPC .................................. B29C 64/40; B33Y 70/00
See application file for complete search history.

(56) References Cited

U.S. PATENT DOCUMENTS

| | | | |
|---|---|---|---|
| 3,121,701 A | 2/1964 | Ingleby | |
| 4,469,837 A | 9/1984 | Cattaneo | |
| 7,067,575 B2 * | 6/2006 | Kitamura | .................... C08J 5/18 524/386 |
| 8,404,171 B2 | 3/2013 | Heenan | |
| 2002/0123546 A1 * | 9/2002 | Bigg | ....................... D21H 17/53 528/355 |
| 2004/0161559 A1 * | 8/2004 | Verrall | ..................... C08L 29/04 428/35.7 |
| 2004/0224173 A1 | 11/2004 | Boyd et al. | |
| 2005/0124756 A1 * | 6/2005 | Miller | .................. C09D 129/04 524/557 |
| 2006/0099410 A1 * | 5/2006 | Miller | .................. C09D 129/04 428/341 |
| 2007/0079454 A1 * | 4/2007 | Duffield | .................. B29C 66/43 8/526 |
| 2007/0246848 A1 * | 10/2007 | Pavan | ..................... B29C 48/29 264/1.29 |
| 2008/0182937 A1 * | 7/2008 | Urian | .................... C11D 17/042 525/58 |
| 2011/0060445 A1 * | 3/2011 | Heenan | ................. B29C 64/106 700/119 |
| 2016/0068678 A1 * | 3/2016 | Luo | ........................ B33Y 70/00 264/308 |
| 2017/0022341 A1 * | 1/2017 | Bayer | .................... B33Y 80/00 |
| 2017/0081442 A1 * | 3/2017 | Johnson | ............... B01J 19/2415 |
| 2019/0160732 A1 * | 5/2019 | Hirai | ....................... B29C 67/00 |
| 2019/0211200 A1 * | 7/2019 | Sakai | ..................... B33Y 70/00 |

FOREIGN PATENT DOCUMENTS

| | | |
|---|---|---|
| CN | 1073457 A | 6/1993 |
| CN | 101033320 A | 9/2007 |
| CN | 101619138 A | 1/2010 |
| CN | 102234405 A | 11/2011 |
| CN | 105001569 A | 10/2015 |
| CN | 105670189 A | 6/2016 |

(Continued)

OTHER PUBLICATIONS

Foundry—"https://hyrulefoundry.wordpress.com/2013/06/03/pva-polyvinyl-alcohol-the-plastic-thats-afraid-of-water/" (Year: 2013).*
European Office Action issued on Mar. 12, 2020, in Patent Application No. 17 793 857.8, 5 pages.
International Preliminary Report on Patentability and Written Opinion issued on Apr. 23, 2019 in PCT/EP2017/076381, 8 pages.
Office Action issued Dec. 10, 2021 in the Chinese Patent Application No. 201780064173.1 dated Oct. 16, 2017 (w/ English-language translation).
Chemical Encyclopedia, vol. 3, 1st edition, December 1. 2021, p. 770 (w/ English-language translation).
Office Action issued May 27, 2021, in Chinese Patent Application No. 201780064173.1 dated Oct. 16, 2017 (w/ English-language translation).
Chemical Encyclopedia, vol. 3, Apr. 24, 2021, p. 766 (w/ English translation).

(Continued)

*Primary Examiner* — Nicholas R Krasnow
(74) *Attorney, Agent, or Firm* — Oblon, McClelland, Maier & Neustadt, L.L.P.

(57) ABSTRACT

The invention is directed to a process of manufacturing a three-dimensional object by—providing a support structure comprising polyvinyl alcohol (PVOH) to—depositing and solidifying a molten thermoplastic polymer on the support structure to form a three-dimensional preform characterized in that the support structure consists of a mixture of polyvinyl alcohol (PVOH) and at most 20% by weight of at least one plasticizer according to formula (I), (II) or (III): —R1-C(CH$_2$—OH)$_3$ (1); —[R1-C(CH$_2$—OH)$_2$CH$_2$]$_2$O (11); —(R1)C(CH$_2$—OH)$_2$CH$_2$—O—CH$_2$C(CH$_2$—OH)C(R1) CH$_2$—O—CH$_2$ C(CH$_2$—OH)2R1 (III). With R1=H, CH3, C$_2$H$_5$, C$_3$H$_7$, CH$_2$OH. The support structure can be dissolved to from the three-dimensional object.

20 Claims, No Drawings

(56) References Cited

FOREIGN PATENT DOCUMENTS

| EP | 0 236 011 A2 | 9/1987 | |
|---|---|---|---|
| EP | 635545 A2 * | 1/1995 | ............. A61F 13/26 |
| WO | WO 2004/101661 A1 | 11/2004 | |
| WO | WO 2015/108768 A1 | 7/2015 | |

OTHER PUBLICATIONS

Complete Collection of Chemical Products in Liaoning, Apr. 24, 2021, pp. 195-196 (w/ English translation).

Office Action dated Feb. 22, 2022 in corresponding European Patent Application No. 17793857.8 issued on Oct. 16, 2017.

Chinese Office Action issued May 20, 2022 in Chinese Patent Application No. 201780064173.1 (with English translation), 11 pages.

Edited by Zu Liwu, Harbin, "Chemical Fiber Molding Technology", Harbin Institute of Technology Press, $1^{st}$ printing of 1st edition in Sep. 2014, p. 224, Sep. 30, 2014 (with English translation).

Wang, L., et al., "Polymer Materials", Beijing: China Light Industry Press, 1st printing of 1st edition in 2009, p. 253, Jan. 31, 2009 (with English translation).

* cited by examiner

USE OF POLYHYDROXY COMPOUND AS PLASTICIZER FOR POLYVINYL ALCOHOL IN 3D PRINTING PROCESS

The invention is directed to the use of compounds of polyvinyl alcohol with polar plasticizer in 3D printing processes.

BACKGROUND 3D printing processes of thermoplastics are gaining more and more importance in production of plastic parts. Due to the process of subsequently depositing drops of melt of thermoplastic polymer, certain structures like hollow sections can not be built directly from the thermoplastic polymer. In such cases, first a support structure is printed on or around the final structure from the thermoplastic polymer is build. The support structure is prepared from a thermoplastic polymer which can be removed by thermal treatment or solvents which do not affect the thermoplastic polymer providing the desired structure.

Thermoplastic polymers which can be used as support structure are for example waxes, polyethylene glycole, High Impact Polystyrene (HIP), polylactid acid, poly(2-ethyl-2-oxazolidone) or hydroxypropyl methylcellulose as disclosed in WO2015/108768A1.

Furthermore, it is known to utilize polyvinyl alcohol (PVOH) as support material in 3D printing processes, since PVOH is a thermoplastic material with a broad melting range which can be easily removed from the final printed structure by dissolving in water or aqueous alkaline solution. In this respect the use of amorphous PVOH as support material in an 3D printing processes is described in U.S. Pat. No. 8,404,171.

For a good thermoplastic process ability of most PVOH grades, plasticizers are required to reduce the melt viscosity as well as improve the thermal stability. However, most common plasticizers significantly increase moisture absorption of the compound compared to pure PVOH. This results in increased softening of the filament, which complicates feeding to the printer nozzle. Further, due to evaporation of absorbed moisture upon melting of the polymer print quality is negatively affected. Especially, when the print head is idle or moving to a new position without material deposition, bubble formation results to a uncontrolled release of melt from the nozzle.

In addition, plasticizers decrease the glass transition and melting temperature of the compound. The glass transition causes the filament to become soft, which can lead to feeding problems in some 3d printers, when e.g. the entire build space is heated to elevated temperature. Thus, a high glass transition temperature of the PVOH filament is beneficial. The same is true for the melting point of the PVOH filament. Usually, a second material is printed on top of the PVOH support structures. In the case when a second material with a high processing temperature is used (e.g. polyamides or copolyesters) partial melting of the support structures during deposition of the second material might occur. This can result in surface defects of the final printed object.

Object of the invention was therefore to provide a compound comprising PVOH and a plasticizer having a low moisture uptake, high melting and glass transition temperature resulting in good printing properties.

Accordingly, the invention is directed to a process of manufacturing a three-dimensional object by
providing a support structure comprising polyvinyl alcohol (PVOH) to
depositing and solidifying a molten thermoplastic polymer on the support structure to form a three-dimensional preform
wherein the support structure consists of a mixture of polyvinyl alcohol (PVOH) and at most 20% by weight of at least one plasticizer according to formula I, II or III

R1-C(CH$_2$—OH)$_3$     (I)

[R1-C(CH$_2$—OH)$_2$CH$_2$]$_2$O     (II)

(R1)C(CH$_2$—OH)$_2$CH$_2$—O—CH$_2$C(CH$_2$—OH)C(R1)CH$_2$—O—CH$_2$C(CH$_2$—OH)$_2$R1     (III)

With R1=H, CH$_3$, C$_2$H$_5$, C$_3$H$_7$, CH$_2$OH 3D printing processes are in general known to the person skilled in the art.

In the process of the invention, one or more plasticizers according to formula I, II or III may be used. Preferred plasticizers are selected from the group consisting of trimethylolpropane (TMP), di(trimethylolpropane), pentaerythritol, dipentaerythritol and tripentaerythritol The mixtures used in the invention show good followability, a reduced moisture absorption and higher glass transition and melting temperatures compared to PVOH compounds based on common plasticizers such as glycerol.

PVOH filaments produced from such mixtures lead to good print quality, even when exposed to some humidity. Filaments exposed to too much moisture produce printed objects with bad surface quality. Stringing between different objects occurs due to uncontrolled material release from the nozzle during movement to next position. This happens due to evaporation of water during melting of the PVOH, which results in foam formation. Uncontrolled released melt is not desired, since this results in embedded material into the printed object at various positions, which leads to bad print quality. Foam formation during printing also negatively affects the dimensional accuracy of the printed structures.

Preferable, the polyvinyl alcohol (PVOH) used in the process of the invention has one or more of the following properties:
- an vinyl acetate content of at least 10 mol %, at least 15 mol % or at least 20 mol %, with an upper limit of 50 mol % to allow water solubility
- a degree of polymerization (DP) of 200-3000, preferable 250-2000 most preferred 300-1500
- a degree of hydrolysis DH of 60-99, preferable 70-95% and most preferred 72-90%
- a viscosity of a 4% aqueous solution of 2-20 mPa*s, preferable 3-10 mPa*s
- an plasticizer content according to formula I, II or III of at most 15 wght %, preferable at most 10 wght % and most preferred at most 5 wght %.

The polyvinyl alcohol (PVOH) composition may comprise one or more PVOH grades, differing in vinyl actetate content and/or degree of polymerization and/or degree of hydrolysis and/or viscosity.

Further, the polyvinyl alcohol (PVOH) may contain as repeating units vinyl alcohol, vinyl acetate and 0 to 20 Mol % of olefinic monomers. Suitable repeating units are for example, but not limited to: ethylene, 1-olefins (e.g. propylene, 1-butene, isobutylene), 1-butene-3,4-diacetate, 1-butene-3,4-diol, vinyl ethers (e.g. methyl vinyl ether, ethyl vinyl ether, n-propyl vinyl ether, isopropyl vinyl ether), N-vinyl amides (e.g. N-vinylpyrrolidone, N-vinylcaprolactam), isopropenyl acetate, isopropanol, allyl acetate, allyl alcohol. The exact composition can be adjusted as necessary for the printing process.

Due to the presence of the plasticizers according to formula I, II or III, the molten polyvinyl alcohol (PVOH) can be deposited in the process of the invention at a temperature of at least 170° C., preferable least 180° C. or more preferred at least 190° C.

The thermoplastic polymer may then be deposited on the support structure at a temperature of at least 140° C.

Optionally the polyvinyl alcohol (PVOH) composition may comprise up to 20% by weight (based on the total weight of the composition) of one or more additional plasticizers. Any compound known to plasticize PVOH such as water, glycerine, diglycerine, sorbitol, ethylene glycol, diethylene glycol, polyethylene glycol, pentaerythritol, dipentaerythritol, propylene glycol, trimethylolpropane, di-trimethylolpropane, triethanolamine may be used for the purpose of the invention.

As thermoplastic polymer, any polymer selected from the group consisting of polylactic acid (PLA), acrylonitrile-butadiene-styrene copolymer (ABS), polyamides (PA), polycarbonates (PC), polyethylene terephthalate (PET), polyethylene terephthalate copolymers (PETG), polyhydroxyalkanoates (PHA), wood filled composites, metal filled composites, carbon fiber filled composites, polyvinylbutyral (PVB), thermoplastic elastomers (TPE), thermoplastic polyurethanes (TPU), polyolefins, polypropylenes (PP), acrylonitrile styrene acrylate (ASA), polyacrylates, polymethacrylates, polyesters, polycaprolactones (PCL), and mixtures thereof can be used.

After the printing process, the support structure i.e. the polyvinyl alcohol (PVOH) may be dissolved, preferable in water and only the three-dimensional object remains. The water used for dissolving the support structure may be pure water or an aqueous solution of alkaline salts. Recycling of process water i.e. use of water already containing dissolved PVOH is also possible.

EXAMPLES

Compounds of PVOH and plasticizers were prepared with a DSM Xplore micro compounder MC 15. All components were mixed thoroughly before filling into the compounder. The samples were homogenized in the compounder at a screw speed of 100 rpm and a melt temperature of 190° C. for 5 minutes. The micro compounder provides a value for the melt viscosity of the sample during extrusion. After homogenization the melt was extruded to a strand with a diameter of ca. 3 mm, which was cut to ca. 3 cm long pieces. The same process was also used to extrude the strand onto a belt with adjustable speed. By controlling the speed the strand diameter was adjusted to obtain a filament of 1,75 mm in diameter. The filament was subjected to 3d printing tests with a Felix Pro 1 3d printer.

PVOH resin from Kuraray Europe GmbH was used. Trimethylolpropane (TMP) was purchased from BASF. Di(trimethylolpropane) (Di-TMP), pentaerythritol (penta) and dipentaerythritol (di-penta) were obtained from Perstorp.

Thermal properties of compounds were determined by DSC measurement with a Netzsch DSC 214 ASC Polyma equipped with an Intracooler 70. A temperature range of −20° C. to 230° C. was used. Melting temperatures were measured at a heating/cooling rate of 10 K/min in the second heating cycle. Glass transition temperatures were derived from a third heating cycle at a heating rate of 30 K/min. The moisture uptake of each sample was determined by placing a defined quantity of the strand pieces of each compound into a climate chamber at 23° C. and a relative humidity of 50%. The weight increase was measured over time.

Comparative Example 1

KURARAY POVAL 6-88 was compounded with 5 wt. % of glycerine. A melt viscosity of 1.11 kPa·s was measured during extrusion. A glass transition temperature Tg of 56.6° C. and a melting temperature Tm of 173.7° C. was measured by DSC. The product absorbed 1.8 wt. % of moisture during storage at 23° C. and 50% relative humidity for 14 days. The product is entirely soluble in water at 25° C.

A 1.75 mm filament extruded from the same formulation was exposed to 23° C. and 50% relative humidity for 14 days before it was used for printing of a test object. Some defects by uncontrolled release of melt from the nozzle by bubble formation were observed, but overall the print quality was still acceptable.

Comparative Example 2

KURARAY POVAL 6-88 was compounded with 10 wt. % of glycerine. A melt viscosity of 0.84 kPa·s was measured during extrusion. A glass transition temperature Tg of 46.7° C. and a melting temperature Tm of 171.6° C. was measured by DSC. The product absorbed 4.0 wt. % of moisture during storage at 23° C. and 50% relative humidity for 14 days. The product is entirely soluble in water at 25° C. A 1.75 mm filament extruded from the same formulation was exposed to 23° C. and 50% relative humidity for 14 days before it was used for printing of a test object. A lot of defects by uncontrolled release of melt from the nozzle by bubble formation were observed. The overall print quality was bad, due to foam formation of the melt.

Examples 1-8

KURARAY POVAL 6-88 was compounded with various amounts of different plasticizers as listed in Table 1. For all experiments the melt viscosity measured by the microcompounder is in a similar range as a comparable compound with glycerine as plasticizer. This indicates efficient plastification of the compound. Generally, all glass transition and melting temperatures were higher than of comparable compounds with glycerine as a plasticizer. The moisture absorption of all compounds was lower than of comparable compounds with glycerine as plasticizer (see Table 1). All compounds are entirely soluble in water at 25° C.

1.75 mm filaments extruded from the formulations were exposed to 23° C. and 50% relative humidity for 14 days before they were used for printing of test objects. For examples 2 and 6 some defects by uncontrolled release of melt from the nozzle by bubble formation were observed, but overall the print quality was still acceptable. Thus, a similar print quality as in comparative example 1 could be achieve, but with double plasticizer content, which allows for faster and easier printing due to lower melt viscosity. All other examples resulted in high printing quality without any significant defects.

TABLE 1

Experimental results for examples 1-8.

| Example | Plasticizer | Melt viscosity$^a$ [kPa · s] | Tg$^b$ [° C.] | Tm$^b$ [° C.] | Moisture absorption$^c$ [wt. %] |
|---|---|---|---|---|---|
| 1 | 5 wt. % TMP | 1.17 | 61.7 | 181.6 | 1.3 |
| C1 | 5 wt % glycerine | 1.11 | 56.6 | 173.7 | 1.8 |
| 2 | 10 wt. % TMP | 0.89 | 52.9 | 182.8 | 2.3 |
| C2 | 10 wt % glycrine | 0.84 | 46.7 | 171.6 | 4.0% |
| 3 | 5 wt. % Di-TMP | 1.22 | 62.6 | 184.7 | 1.1 |
| 4 | 10 wt. % Di-TMP | 0.98 | 56.6 | 183.7 | 1.4 |
| 5 | 5 wt. % penta | 1.24 | 64.0 | 179.0 | 1.3 |
| 6 | 10 wt. % penta | 0.95 | 53.1 | 170.5 | 2.1 |
| 7 | 5 wt. % Di-penta | 1.27 | 64.3 | 181.5 | 1.1 |
| 8 | 10 wt. % Di-penta | 1.07 | 56.8 | 179.2 | 1.1 |

$^a$Melt viscosity measured by the microcompounder.
$^b$Glass transition temperature Tg and melting temperature Tm determined by DSC.
$^c$Moisture absorption at 23° C. and 50% relative humidity after 14 days.
TMP = trimethylolpropane,
Di-TMP = di(trimethylolpropane),
penta = pentaerythritol,
Di-penta = dipentaerythritol

The invention claimed is:

1. A process of manufacturing a three-dimensional object, comprising:
depositing and solidifying a molten thermoplastic polymer on a support structure to form a three-dimensional preform,
wherein the support structure consists of a mixture of polyvinyl alcohol (PVOH), at least one plasticizer according to formula II or III, and optionally an additional plasticizer that is chemically distinct from the plasticizers according to formulae II and III:

[R1—C(CH$_2$—OH)$_2$CH$_2$]$_2$O   (II)

(R1)C(CH$_2$—OH)$_2$CH$_2$·O—CH$_2$C(CH$_2$—OH)C(R1)
CH$_2$·O—CH$_2$C(CH$_2$—OH),R1   (III)

wherein R1 is H, CH$_3$, C$_2$H$_5$, C$_3$H$_7$, or CH$_2$OH,
wherein the at least one plasticizer according to formula II or III is present in an amount of no greater than 20% by weight relative to a total weight of the PVOH,
wherein the support structure has a glass transition point (T$_g$) of greater than 46.7° C.,
wherein the PVOH has a degree of hydrolysis of 60-90%,
wherein the PVOH comprises as repeating units vinyl alcohol, vinyl acetate and up to 20 Mol % of further olefinic monomers.

2. The process according to claim 1, wherein the plasticizer is at least one selected from the group consisting of di(trimethylolpropane), dipentaerythritol and tripentaerythritol.

3. The process according to claim 1, wherein the polyvinyl alcohol (PVOH) has a vinyl acetate content of at least 10 mol %.

4. The process according to claim 1, wherein the polyvinyl alcohol (PVOH) has a degree of polymerization of 200 to 3000.

5. The process according to claim 1, wherein the polyvinyl alcohol (PVOH) has a degree of hydrolysis of 70-90%.

6. The process according to claim 1, wherein the support structure is dissolved to form the three-dimensional object.

7. The process according to claim 6, wherein the support structure is dissolved in water.

8. The process according to claim 1, wherein the molten polyvinyl alcohol (PVOH) is deposited at a temperature of at least 170° C.

9. The process according to claim 1, wherein the thermoplastic polymer is deposited on the support structure at a temperature of at least 140° C.

10. The process according to claim 1, wherein the thermoplastic polymer is at least one selected from the group consisting of polylactic acid (PLA), acrylonitrile-butadiene-styrene copolymer (ABS), polyamides (PA), polycarbonates (PC), polyethylene terephthalate (PET), polyethylene terephthalate copolymers (PETG), polyhydroxyalkanoates (PHA), wood filled composites, metal filled composites, carbon fiber filled composites, polyvinylbutyral (PVB), thermoplastic elastomers (TPE), thermoplastic polyurethanes (TPU), polyolefins, polypropylenes (PP), acrylonitrile styrene acrylate (ASA), polyacrylates, and polymethacrylates.

11. The process according to claim 1, wherein:
the support structure consists of the mixture of polyvinyl alcohol (PVOH), the at least one plasticizer according to formula II or III, and the additional plasticizer that is chemically distinct from the plasticizers according to formulae II and III, and the additional plasticizer has a formula I:

R1—C(CH$_2$—OH)$_3$   (I)

wherein R1 is H, CH$_3$, C$_2$H$_5$, C$_3$H$_7$, or CH$_2$OH.

12. The process according to claim 11, wherein the additional plastisizer is trimethylolpropane, pentaerythritol, or both.

13. The process according to claim 1, wherein the at least one plasticizer according to formula II or III is present in an amount of no greater than 10% by weight relative to a total weight of the PVOH.

14. The process according to claim 1, wherein the at least one plasticizer according to formula II or III is present in an amount of no greater than 5% by weight relative to a total weight of the PVOH.

15. The process according to claim 1, wherein the at least one plasticizer according to formula II or III is di(trimethylolpropane), dipentaerythritol, or both.

16. The process according to claim 1, wherein the support structure has a moisture adsorption of 1-2.1 wt %, wherein the moisture adsorption is determined by weight increase of the support structure after being exposed at 23° C. and 50% relative humidity for 14 days.

17. The process according to claim 1, wherein the support structure has a melting temperature (T$_m$) of at least 170° C.

18. The process according to claim 1, wherein the support structure has a melt viscosity in a range of 0.8-1.3 kPa·s.

19. The process according to claim 1, wherein the support structure has a glass transition point (T$_g$) ranging from 52.9° C. to 64.3° C.

20. The process according to claim 1, wherein the molten polyvinyl alcohol (PVOH) is deposited at a temperature of at least 180° C.

* * * * *